United States Patent Office 3,399,176
Patented Aug. 27, 1968

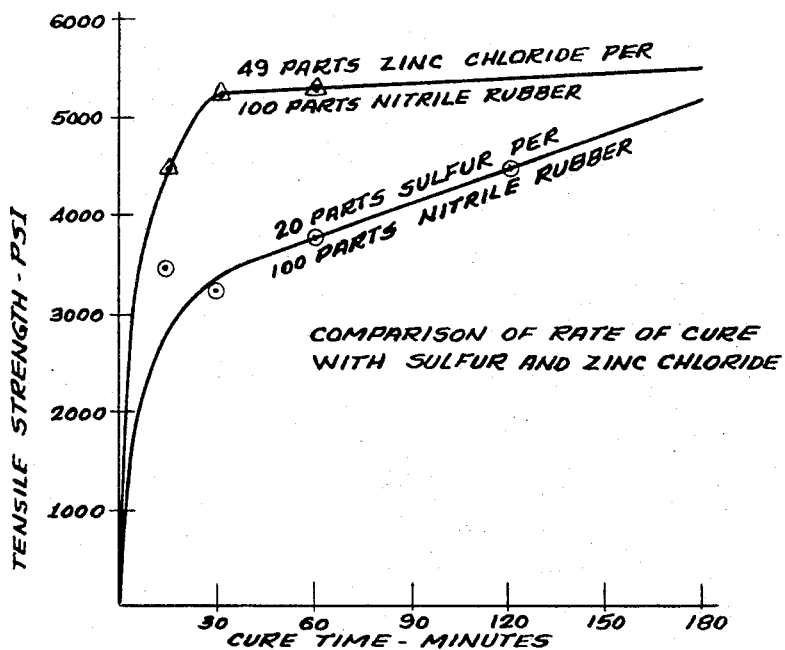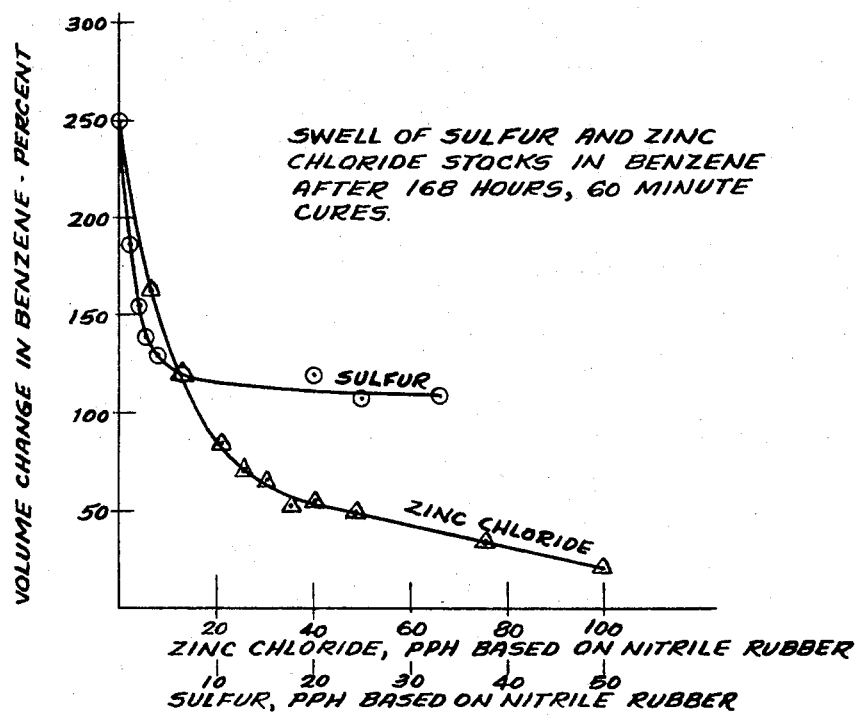

3,399,176
CURING NITRILE RUBBERS WITH SULFUR
AND METAL HALIDES
Herman V. Boenig, Lexington, Ky., and Richard A. Clark
and Kenneth J. Gregory, Muskegon, Mich., assignors
to Brunswick Corporation, a corporation of Delaware
Filed Dec. 2, 1965, Ser. No. 511,124
6 (Claims. (Cl. 260—83.3)

ABSTRACT OF THE DISCLOSURE

Curing plasticized or non-plasticized nitrile rubber with metal halide to give improved properties in shorter cure time with regard especially to hardness, tensile strength, and resistance to swell in benzene. The cure can be effected by a synergistic effect of sulfur in combination with the metal halide and the rubber cures to Rockwell values within 15 minutes. The halide can be introduced into the rubber conjointly with water as an aqueous paste or solution. A new cured rubber product is also described.

---

This invention relates to the curing of nitrile rubber and especially relates to the use of cross-linking or vulcanizing agents for curing nitrile rubber. This invention also relates to cured or curable nitrile rubber compositions.

It has been known to cure or cross-link nitrile rubber with sulfur and sulfur-liberating materials, free radical mechanisms, oxidants and the like. Curing with sulfur is a common procedure in that such curing produces a product having good physical properties in terms of tensile strength, hardness, elongation and resistance to swelling. However, curing or vulcanizing such rubber compositions as nitrile rubber with sulfur requires such an extended cure time that it is impractical for use in applications where short cure times are necessary.

Recently, plastics have made greater inroads for use in preparing molding articles formerly prepared from rubber compositions. One advantage of plastics which can be considered to be at least a part of the cause of their increased use as molding compounds is the ability of many plastic compositions to be molded in a very short period of time. The plastic compositions may, therefore, be used in injection molding techniques which generally cannot be used in producing cured hard nitrile rubber articles.

It is a general object of this invention to provide a new and useful cured nitrile rubber composition and a curing method employing a new and useful curing agent for nitrile rubber.

Another object of this invention is to provide a curing agent for nitrile rubber which renders the nitrile rubber curable in a short cure time under normal nitrile rubber curing conditions.

Still another object of this invention is to provide a method in which a new and improved curing agent for nitrile rubber is mixed with the nitrile rubber and thereafter cured to form a product having good tensile strength, good hardness, good resistance to elongation and good resistance to swelling in organic fluids, such as benzene.

Another object of this invention is to provide such a method and composition in which the action of the curing agent is compatible with the usual fillers, plasticizers and/or vulcanization accelerators used in the curing of nitrile rubber.

We have now found that metal halides are useful as cross-linking or vulcanizing agents in the curing of nitrile rubbers. In compositions prepared in accordance herewith, the effect obtained by using the metal halide appears, in some aspects, to be similar to that obtained when using sulfur as a cross-linking or vulcanizating agent. This similarity is evidenced from the physical properties of the cured nitrile rubber, such as with respect to tensile strength, hardness, elongation and swelling. However, the curing with metal halide is accomplished in a much shorter time than with sulfur and is believed to operate by a different mechanism.

The metal halide apparently functions by a mechanism which does not necessarily consume or use hydrocarbon chain positions such as the double bonds used in sulfur vulcanization. The metal halides appear to form a coordinated chelate-type structure with nitrile groups of adjacent molecules or within the same molecule, the latter resulting in cyclization of the molecule.

On the other hand, use of sulfur cross-linking agents yields a cured nitrile rubber structure having carbon-to-carbon bonds, carbon-to-sulfur-to-carbon bonds or carbon-to-polysulfur-to-carbon bonds. The bonds are formed by action of the cross-linking agent on the hydrocarbon chain of the rubber, e.g. at an unsaturated linkage, at an active hydrogen or the like. Whether the mechanism is considered as a free radical or ionic mechanism, the structural result appears to be the same.

The metal halide cured nitrile rubber, according to this invention, has many of the properties of the previously known sulfur-cured nitrile rubber. A major advantage over the sulfur-cured nitrile rubber appears to be the ability of the metal halide to cure in a shorter period of time. Other advantages include improvements in tensile strength, hardness, etc., at least after comparable cure times.

A tendency of the metal halide cured nitrile rubber to swell in the presence of some aromatic hydrocarbons, and especially in the presence of water, has been observed. Such tendency, although it may be acceptable in many applications, can result in limitations on the scope of the field of application of the cured product. Thus, this invention provides a further improvement in metal halide curing of nitrile rubber, for decreasing swelling in water while providing even faster cures.

Accordingly, it is another general object of this invention to provide a new and useful cured nitrile rubber composition and a curing method employing a new and useful combination of curing agents for nitrile rubber.

Another object of this invention is to improve the curing of nitrile rubber by using a synergistic plurality of conjointly active curing agents.

Still another object of this invention is to provide a method in which the nitrile rubber is cured with a mixture of curing agents which causes formation of a cured product having good tensile strength, good hardness, good resistance to elongation and improved resistance to swelling, especially in water.

Another object of this invention is to provide such a new and useful method in which one of the plurality of curing agents is of the metal halide type and in which the cure time is rendered shorter at a lower metal halide concentration.

Accordingly, in a preferred form of the invention, the metal halide curing agent is used in combination with a sulfur curing agent in the method and compositions of this invention, to obtain a structure in which there is believed to be dual vulcanization, including vulcanization via the chelate linkage with the metal halide in addition to vulcanization via the chain linkage by the sulfur.

Other objects and features will be apparent from the descriptions given hereinbelow.

FIGURE 1 is an illustration of a plot of data from Table I showing comparative tensile strength of a nitrile rubber cured using zinc chloride alone and a nitrile rubber cured using sulfur alone, plotted against cure time; and FIGURE 2 is an illustration of a plot of data from Table I showing comparative resistance to swelling in aromatic solvent with respect to zinc chloride and sulfur-cured nitrile rubbers.

Nitrile rubber is a common name applied to copolymers of the acrylonitrile and butadiene which are produced in a wide variety of monomer unit ratios. For example, low nitrile rubbers may have an acrylonitrile:butadiene ratio of as low as about 18:82 or lower while the high nitrile rubber may range up to 42 units acrylonitrile or higher per 58 units butadiene. Any of the nitrile rubbers may be used in accordance herewith, and the curing agents of the present invention are capable of producing both soft and hard varieties of nitrile rubbers. Specific examples of suitable nitrile rubbers are Chemigum N300 which is an acrylonitrile-butadiene copolymer having 42 to 43% acrylonitrile content and Chemigum N625 having 32 to 33% acrylonitrile content, both marketed by Goodyear Tire & Rubber Company. Other commercially available nitrile rubbers will be apparent to those in the art.

The metal halide may be a fluoride, chloride, bromide, or iodide or any of the metals of the periodic table. However, we have found particularly advantageous the chlorides, bromides, and iodides of zinc, nickel, cadmium and cobalt. The preferred metal is zinc and the preferred halogen is chlorine. The nature of the metal and halogen for producing stiffening results in the nitrile rubber does not appear to be critical. However, zinc chloride appears to stiffen the nitrile to a greater extent than that accomplished with other metal halides on a molar basis and the zinc chloride is therefore preferred. We have found that the addition of a small amount of water, e.g. about 10%, to the dry metallic halides, produces a paste-like product which is easy to disperse in the rubber during mixing. Where the composition is to be subjected to mill rolls, such small amounts of water are preferred since large amounts of water may cause the rolls to become slippery, making mixing more difficult. However, if a Banbury mixer or the like is to be used instead of the roll mill, it may be preferred to use a true aqueous solution of the halide. In either event it is preferred to include sufficient water to disperse the halide in the recipe, as a paste or as a solution.

The amount of metal halide used is not limited or critical to a specific minimum or maximum or specific range. The amount will vary with the amount of cure desired and the desired properties of the cured product. For example, as a guide, from one part or less metal halide up to 500 parts or more metal halide per 100 parts by weight nitrile rubber may be used. Usually the amount of metal halide will be in the range of 5 to 200 parts per 100 parts of nitrile rubber.

In the cross-linking or vulcanizing of the nitrile rubber the usual or conventional curing procedures may be used except that the metal halide curing agent is mixed with the nitrile rubber prior to curing. The procedures and curing conditions are well known in the art. In curing nitrile rubber, temperatures of about 300° F. or 310° F. are often used, e.g. 290° F. to 320° F.; however, such curing conditions can be modified by those in the art with respect to the rubber formulation used. During such procedures the usual fillers such as carbon black, as well as the usual plasticizers, including compatible oils, may be used, and in an advantageous form of the invention, the fillers and/or plasticizers are present for the purpose of increasing resistance to swelling in water. Further, it has been found that the metal halide curing system is compatible with the usual rubber vulcanization accelerators such as benzothiazyl disulfide as well as other components in curable nitrile rubber recipes.

As indicated, many of the properties of the present products are similar to those of sulfur-cured nitrile rubbers. However, it has been found that some differences do exist; for example, a zinc chloride cured nitrile hard rubber exhibits a higher softening point (about 51° C.) than the corresponding sulfur-cured hard rubber (about 30° C.). Also, the resistance to swelling in such hydrocarbon solvents as benzene or toluene is markedly improved when using metal halide in lieu of sulfur as the vulcanizing agent.

It is believed that the metal halides function as chelating agents in forming stable complexes with nitrile groups of adjacent nitrile rubber molecules or within the same molecule, the latter resulting in cyclizing the molecule.

In the production of a cured nitrile rubber article, a normal procedure is to break down the acrylonitrile rubber, mill it with fillers, accelerators, curing agents, oils, and the like as desired, and subsequently subject the milled, mixed composition to curing temperatures and pressures. In the present method it is preferred to add the metal halide curing agent after addition of and mixing of any filler materials to be added to the nitrile rubber, intimately mix the curing agent with the mixing or milling mass and thereafter subject the composition to curing conditions. A very suitable procedure is outlined in ASTM D15–59T, as revised Nov. 1959.

Examples illustrating the production of cured nitrile rubber products of this invention are tabulated hereinbelow. Also, certain preparations, not in accordance with this invention, were made for comparison purposes. The ingredients of each example recipe and preparation recipe are identified in the tables hereinbelow, the example recipes being prefixed with the letter E and the preparation recipes being prefixed with the letter P. In each example and preparation, the general procedure of ASTM D15–59T for nitrile rubber was followed with the exception which will be evident in the procedural steps described below.

In each example and preparation, the recipe was weighed out as a batch recipe using 500 grams of the nitrile rubber and proportional amounts of the remainder of the ingredients. The following procedural steps were followed for each example and preparation:

(1) Pass the nitrile rubber twice through a tight laboratory mill with six-inch diameter rolls, open mill, band and break down rubber for five minutes. Cooling water is passed through the holes during break-down and mixing except as otherwise indicated.

(2) Add stearic acid, zinc oxide, benzothiazyl disulfide accelerator and one-half of the carbon black filler. Open rolls as necessary to maintain uniform rolling bank.

(3) Make a ¾ cut from each side.

(4) Add the remaining carbon black.

(5) Add the sulfur, if indicated in the recipe.

(6) Cut the batch from the mill.

(7) Set the mill opening to about .050 inch and pass the rolled stock through the mill six times. Open mill to a uniform rolling bank. Turn off cooling water.

(8) Slowly add the metal halide dispersed in sufficient water to give it the consistency of a paste. When the batch becomes quite warm, turn the cooling water on again. Set the mill at about 0.050 inch and pass rolled stock through the mill six times. Turn off the cooling water.

(9) Sheet off the batch at about 0.100 inch.

(10) Cut 6″ x 6″ squares from the stock.

(11) Cure the stock in a 6″ x 6″ x .075″ four cavity

ASTM mold using a steam-heated press at the temperatures and for the times indicated in the tables.

The milling prior to curing required approximately 30 min. for each recipe. Adidtional times, of course, would be required for milling larger batches.

Examples of the present invention are identified as E-1 through E-45 in the tables below while the preparations are P-1 through P-11, each having been carried out in accordance with the above-outlined procedure to produce a cured product.

The cure temperatures and times for the cure of each sample are indicated in the tables below. Where a plurality of different cure times are given in the test results, these represent separately cured aliquots of the identified recipe, each including 500 grams nitrile rubber. The tests carried out on the cured samples, with results reported, are standard. For procedures, reference is made to the following:

ASTM D15-59T—Sample Preparation for Physical Testing.

ASTM D412-511—Tensile Testing of Vulcanized Rubber.

ASTM D676-59T—Indication of Rubber by Means of a Durometer.

ASTM D1484-59—Penetration of Hard Rubber by Type D Durometer.

ASTM D471-59T—Immersion in Liquids, Changes in Physical Properties of Elastomeric Vulcanizates Resulting From.

Wherever "plus" signs are used following reported test results in the tables, the result is approximately the value reported but believed to be slightly higher. The hardness test results include Shore A values for soft rubbers, Shore D values for harder rubbers and Rockwell L values for the very hard rubbers. Room temperature, where used, is considered to be about 25° C.

TABLE I

| Recipe, in parts by weight | P-1 | P-2 | P-3 | P-4 | P-5 | P-6 | P-7 | P-8 | P-9 |
|---|---|---|---|---|---|---|---|---|---|
| Chemigum N300 | 100 | 100 | 100 | 100 | 100 | 100 | 100 | 100 | 100 |
| MPC Black | 40 | 40 | 40 | 40 | 40 | 40 | 40 | 40 | 40 |
| Zinc Oxide | 3 | 3 | 3 | 3 | 3 | 3 | 3 | 3 | 3 |
| Stearic Acid | 2 | 2 | 2 | 2 | 2 | 2 | 2 | 2 | 2 |
| Benzothiazyl Disulfide | 1.5 | 1.5 | 1.5 | 1.5 | 1.5 | 1.5 | 1.5 | 1.5 | 1.5 |
| Sulfur | | 1 | 2 | 3 | 4 | 7 | 20 | 25 | 35 |
| Zinc Chloride | | | | | | | | | |
| Cure at 310° F. | | | | | | | | | |
| Tensile Strength, Max., p.s.i.: | | | | | | | | | |
| 15 minute cure | 205+ | 1,950 | 3,190 | 3,890 | 4,000 | 3,760 | 3,420 | 2,820 | 2,240 |
| 30 minute cure | 330+ | 3,340 | 4,210 | 4,080 | 3,740 | 3,250 | 3,260 | 3,150 | 2,450 |
| 60 minute cure | 500+ | 3,890 | 3,920 | 3,320 | 3,600 | 3,270 | 3,740 | 3,730 | 3,230 |
| 120 minute cure | | | | | | | 4,480 | | |
| Elongation, Percent: | | | | | | | | | |
| 15 minute cure | 1,400+ | 900+ | 850 | 750 | 600 | 420 | 350 | 375 | 375 |
| 30 minute cure | 1,200+ | 800 | 600 | 420 | 420 | 220 | 200 | 175 | 175 |
| 60 minute cure | 1,150+ | 700 | 450 | 320 | 250 | 150 | 110 | 100 | 90 |
| 120 minute cure | | | | | | | 49 | | |
| Hardness, Shore A, Shore D (D), or Rockwell L (R): | | | | | | | | | |
| 15 minute cure | 55 | 62 | 63 | 66 | 69 | 74 | 79 | 72 | 73 |
| 30 minute cure | 55 | 65 | 68 | 72 | 73 | 80 | 83 | 80 | 80 |
| 60 minute cure | 56 | 68 | 71 | 75 | 78 | 84 | 91 | 89 | 88 |
| Swell in Benzene, at Room Temperature, After 24 Hours, Percent by Volume: | | | | | | | | | |
| 30 minute cure | 295 | 209 | 169 | 154 | 151 | 119 | 101 | 97 | 99 |
| 60 minute cure | 288 | 193 | 156 | 140 | 129 | 103 | 75 | 71 | 71 |
| Swell in Benzene, at Room Temperature, After 168 hours, Percent by Volume: | | | | | | | | | |
| 30 minute cure | 242 | 195 | 166 | 152 | 149 | 103 | 103 | 154 | 158 |
| 60 minute cure | 249 | 187 | 154 | 138 | 128 | 118 | 118 | 107 | 109 |

| Recipe, in parts by weight | E-1 | E-2 | E-3 | E-4 | E-5 | E-6 | E-7 | E-8 | E-9 | E-10 |
|---|---|---|---|---|---|---|---|---|---|---|
| Chemigum N300 | 100 | 100 | 100 | 100 | 100 | 100 | 100 | 100 | 100 | 100 |
| MPC Black | 40 | 40 | 40 | 40 | 40 | 40 | 40 | 40 | 40 | 40 |
| Zinc Oxide | 3 | 3 | 3 | 3 | 3 | 3 | 3 | 3 | 3 | 3 |
| Stearic Acid | 2 | 2 | 2 | 2 | 2 | 2 | 2 | 2 | 2 | 2 |
| Benzothiazyl Disulfide | 1.5 | 1.5 | 1.5 | 1.5 | 1.5 | 1.5 | 1.5 | 1.5 | 1.5 | 1.5 |
| Sulfur | | | | | | | | | | |
| Zinc Chloride | 7 | 14 | 21 | 25 | 30 | 35 | 40 | 49 | 75 | 100 |
| Cures at 310° F. | | | | | | | | | | |
| Tensile Strength, Max., p.s.i.: | | | | | | | | | | |
| 15 minute cure | 2,540 | 3,130 | 2,760 | 2,850 | 3,120 | 3,030 | 5,610 | 4,460 | 3,830 | 3,620 |
| 30 minute cure | 3,150 | 3,750 | 3,140 | 3,470 | 4,340 | 6,410 | 8,170 | 5,250 | 4,670 | 2,740 |
| 60 minute cure | 3,740 | 3,800 | 3,700 | 3,130 | 7,080 | 7,170 | 9,890 | 5,290 | 3,650 | 3,670 |
| 120 minute cure | | | | | | | | | | |
| Elongation, Percent: | | | | | | | | | | |
| 15 minute cure | 950 | 700 | 600 | 525 | 400 | 475 | 260 | 1 | 153 | 0 |
| 30 minute cure | 900 | 650 | 450 | | 237 | | 180 | 0 | 1 | 0 |
| 60 minute cure | 770 | 550 | 380 | 330 | 290 | 180 | 90 | 0 | 0 | 0 |
| 120 minute cure | | | | | | | | | | |
| Hardness, Shore A, Shore D (D), or Rockwell L (R) | | | | | | | | | | |
| 15 minute cure | 69 | 79 | 82 | 35(D) | 52(D) | 62(D) | 74(D) | 83(D) | 72(D) | 72(R) |
| 30 minute cure | 72 | 80 | 91 | 55(D) | 70(D) | 73(D) | 60(R) | 87(D) | 78(D) | 80(R) |
| 60 minute cure | 72 | 83 | 96 | 69(D) | 75(D) | 54(R) | 83(R) | 87(D) | 85(D) | 100(R) |
| Swell in Benzene, at Room Temperature, After 24 Hours, Percent by Volume: | | | | | | | | | | |
| 30 minute cure | 180 | 119 | 81 | 79 | 56 | 39 | 30 | 12.7 | 22 | 10.4 |
| 60 minute cure | 161 | 115 | 78 | 65 | 50 | 33 | 23 | 20 | 12.2 | 4.6 |
| Swell in Benzene, at Room Temperature, After 168 hours, Percent by Volume: | | | | | | | | | | |
| 30 minute cure | 110 | 123 | 90 | 82 | 69 | 58 | 140 | 54 | 73 | 52 |
| 60 minute cure | 159 | 117 | 85 | 72 | 64 | 53 | 54 | 48 | 34 | 33 |

TABLE II

| Recipe, in parts by weight | E-11 | E-12 | E-13 |
|---|---|---|---|
| Chemigum N300 | 100 | 100 | 100 |
| Zinc Chloride | 20 | 50 | 100 |
| Cures at 300° F. | | | |
| Hardness, Shore A, (Shore D (D) and Rockwell L (R): | | | |
| 5 minute cure | | 60 | 60(D) |
| 30 minute cure | | | 102(R) |
| 60 minute cure | | 70 | 70(D) |

TABLE III

| Recipe, in parts by weight | E-14 | E-15 | E-16 | E-17 | E-18 |
|---|---|---|---|---|---|
| Chemigum N300 | 100 | 100 | 100 | 100 | 100 |
| MPC Black | | 40 | 40 | 40 | 40 |
| Zinc Oxide | | | 3 | 3 | 3 |
| Stearic Acid | | | | 2 | 2 |
| Benzothiazyl Disulfide | | | | | 1.5 |
| Zinc Chloride | 14 | 14 | 14 | 14 | 14 |
| Cures at 310° F. | | | | | |
| Tensile Strength, Max., p.s.i.: | | | | | |
| 15 minute cure | 557+ | 2,300 | 1,390 | 1,470 | 3,190 |
| 30 minute cure | 470 | 2,760 | 1,980 | 1,900 | 3,210 |
| 60 minute cure | 620 | 2,640 | 2,960 | 2,800 | 3,740 |
| Elongation, percent: | | | | | |
| 15 minute cure | 1,050+ | 850 | 975 | 950 | 670 |
| 30 minute cure | 800 | 600 | 750 | 670 | 520 |
| 60 minute cure | 620 | 400 | 500 | 500 | 420 |
| Hardness, Shore D: | | | | | |
| 15 minute cure | 45 | 65 | 72 | 72 | 75 |
| 30 minute cure | 45 | 65 | 75 | 76 | 77 |
| 60 minute cure | 49 | 69 | 76 | 79 | 82 |

TABLE IV

| Recipe, in parts by weight | P-10 | E-19 | E-20 | E-21 | E-22 |
|---|---|---|---|---|---|
| Chemigum N300 | 100 | 100 | 100 | 100 | 100 |
| MPC Black | 40 | 40 | 40 | 40 | 40 |
| Zinc Oxide | 3 | 3 | 3 | 3 | 3 |
| Stearic Acid | 2 | 2 | 2 | 2 | 2 |
| Benzothiazyl Disulfide | 1.5 | 1.5 | 1.5 | 1.5 | 1.5 |
| Zinc Chloride (M.W. 136.29) | | 14 | | | |
| CdCl$_2$·2½H$_2$O (M.W. 228.36) | | | 23 | | |
| NiCl$_2$·6H$_2$O (M.W. 237.70) | | | | 24 | |
| CoCl$_2$·NH$_2$O (M.W. 237.95) | | | | | 24 |
| Cures at 310° F. | | | | | |
| Tensile Strength, Max., p.s.i.: | | | | | |
| 15 minute cure | 205 | 3,130 | 360 | 1,420 | 1,830 |
| 30 minute cure | 330 | 3,750 | 500 | 1,640 | 2,180 |
| 60 minute cure | 500 | 3,800 | 730 | 1,900 | 2,870 |
| Elongation, percent: | | | | | |
| 15 minute cure | 1,400 | 700 | 1,370 | 700 | 290 |
| 30 minute cure | 1,200 | 650 | 1,300 | 600 | 330 |
| 60 minute cure | 1,150 | 550 | 1,200 | 570 | 390 |
| Hardness, Shore A: | | | | | |
| 15 minute cure | 55 | 79 | 67 | 64 | 59 |
| 30 minute cure | 55 | 80 | 67 | 64 | 67 |
| 60 minute cure | 56 | 83 | 68 | 64 | 67 |
| Swell in Benzene at Room Temperature After 24 Hours, Percent by Volume: | | | | | |
| 30 minute cure | 295 | 119 | 270 | 214 | 184 |
| 60 minute cure | 288 | 115 | 258 | 196 | 174 |

One of the most important advantages of the present invention is the short cure time necessary to obtain desirable nitrile rubber properties, as compared against cure times of sulfur-cured nitrile rubber. Referring to Table I, as an example, a nitrile rubber containing 49 parts zinc chloride (e.g. Example E-8) has already reached or approximated its highest values of tensile hardness and swell resistance after a 30 minute cure, while the sulfur-cured hard rubber containing 20 parts sulfur (e.g. Preparation P-7) would require about 180 minutes to develop its highest values with respect to such properties, when cured at 310° F. Referring to FIGURE 1, it is apparent from the illustrated curves that equivalent tensile strength properties can be obtained about six times faster when zinc chloride is used in lieu of sulfur as the curing agent. Further, hard rubber vulcanized with zinc chloride exhibits a considerably higher resistance to aromatic solvents than does the sulfur-cured hard nitrile rubber, as can readily be seen by comparison of the curves in FIGURE 2.

With respect to the hardness, the data of Table I demonstrates that the zinc chloride cured compositions developed hardness more rapidly than those cured with sulfur. The nitrile rubbers can be seen to advance through the soft rubber range (Shore A range), an intermediate hard rubber range (Shore D range) and into the harder hard rubber range (Rockwell L). In the case of curing with zinc chloride, the Rockwell range can be attained with 15 minutes, and in several instances Rockwell L hardness values of over 100 have been obtained in as short a cure time as five minutes. On the other hand, sulfur-cured hard rubbers normally require about 120 minutes to develop comparable hardness values.

It has been found that very simple formulations can be used to obtain hard products when curing nitrile rubber with zinc chloride. For example, as reported in Table II, a zinc chloride cure of nitrile rubber alone, in the absence of fillers and other materials often included in a rubber recipe, can produce a Rockwell L hardness of over 100. Even with the use of various rubber recipe compounding ingredients, good hardness and other properties are still obtained in the metal halide curing. In Table III, the data demonstrate that reinforcement is maintained with carbon black and that better properties are obtained in a shorter time in the presence of a rubber accelerator such as benzothiazyl disulfide. Such improvements should also be obtained when using fillers other than carbon black or when using other rubber accelerators.

In Table IV it is demonstrated that other metallic halides also produce stiffening of nitrile rubber, though to a lesser extent than that accomplished with zinc chloride. In an advantageous form of the present invention, an amount of metal halide can be added to the nitrile rubber sufficient to precondition the nitrile rubber for fast molding processes. The exact amount may, of course, depend on the remainder of the formulation and the cure conditions involved. However, it is believed that at least about 50 parts zinc chloride based on 100 parts nitrile rubber should be used for this purpose, the 49 parts zinc chloride of Example E-8 giving indications of such fast hardening. For such a fast curing molding composition, e.g. of the type which may find use in injection molding or the like, attention is directed to Example E-10 of Table I in which 100 parts zinc chloride were included per 100 parts of nitrile rubber.

When milling large amounts of metal halide into the nitrile rubber (e.g. Example E-10) in the presence of the water, e.g. from the metal halide paste, the product became quite hot on the mill and hardened immediately upon removal from the mill and cooling. The hard product was found to be moldable into a hard sheet in a molding cycle as short as five minutes. After molding, the hard sheet behaved in many ways like a thermoplastic material and could be remolded, e.g. by injection molding procedures. The Rockwell hardness of such products of high metal halide content were found to be often greater than 100.

In a highly advantageous form of the invention, a cross-linking curing agent such as sulfur is included in the curable nitrile rubber in addition to the metal halide. In accordance with the preferred technique in carrying out this highly advantageous form of the invention, the metal halide and sulfur are both intimately mixed with the uncured nitrile rubber and the resulting mixture is subjected to curing conditions, i.e. curing temperature and pressure. Prior to addition of the sulfur and metal halide, the nitrile rubber may be broken up, milled with fillers, accelerators, oils and the like as desired and otherwise modified as needed to fulfill particular requirements. It is preferred to add the metal halide and sulfur after addition of and mixing of any filler materials, plasticizers, accelerators, etc., to be added to the nitrile rubber.

Although the metal halide alone cures nitrile rubber in a reasonably short curing time, the combination of the metal halide and sulfur curing agent can provide an even faster cure rate at a lower metal halide concentration. In either case, the cure time can be sufficiently short for use in injection molding techniques.

The amounts and proportions of the metal halide and sulfur may be varied to meet the desired properties of the product nitrile rubber in the same manner in which amounts of curing agents have previously been variable to effect the product characteristics. As a guide for the combination curing agent, we have found amounts in the range of 10 to 100 parts metal halide and 10 to 30 parts sulfur per 100 parts of nitrile rubber entirely acceptable. The amounts used are again not critical, but will vary and can be selected with respect to the desired cure time and/or with respect to the desired properties of the cured product. For example, for a very fast curing composition, e.g. suitable for use in injection molding, higher levels of the curing agents may prove desirable.

The products prepared in accordance herewith also exhibit an increased resistance to swelling, e.g. in aromatic solvents and water. In one especially preferred form of the present invention, sufficient amounts of metal halide and sulfur are used to cross-link or vulcanize the nitrile rubber to the desired state or hardness. For example, in the production of very hard rubber, an amount of metal halide sufficient to chelate all nitrile groups and an amount of sulfur sufficient to cross-link all unsaturated linkages of the nitrile rubber are used.

Metal halide cured nitrile rubber has been found to have a tendency to swell in water. However, the vulcanizates using sulfur and metal halide in combination as the curing agent do not pick up water to the same extent as that evidenced by vulcanizates cured with metal halide alone. For example, compare the water swell data of Examples E-7 and E-30 in Table V:

TABLE V.—EFFECT OF SULFUR-ZINC CHLORIDE COMBINATIONS ON PHYSICAL PROPERTIES OF NITRILE RUBBER VULCANIZATES

| Recipe, in parts by weight | E-23 | E-24 | E-25 | E-26 | E-27 | E-28 | E-29 | E-30 | E-31 | E-32 | E-33 | E-34 | E-35 |
|---|---|---|---|---|---|---|---|---|---|---|---|---|---|
| Chemigum N300 [1] | 100 | 100 | 100 | 100 | 100 | 100 | 100 | 100 | 100 | 100 | 100 | 100 | 100 |
| MPC Black | 40 | 40 | 40 | 40 | 40 | 40 | 40 | 40 | 40 | 40 | 40 | 40 | 40 |
| Zinc Oxide | 3 | 3 | 3 | 3 | 3 | 3 | 3 | 3 | 3 | 3 | 3 | 3 | 3 |
| Stearic Acid | 2 | 2 | 2 | 2 | 2 | 2 | 2 | 2 | 2 | 2 | 2 | 2 | 2 |
| Benzothiazyl Disulfide | 1.5 | 1.5 | 1.5 | 1.5 | 1.5 | 1.5 | 1.5 | 1.5 | 1.5 | 1.5 | 1.5 | 1.5 | 1.5 |
| Sulfur | 2 | 5 | 10 | 5 | 10 | 5 | 10 | 20 | 40 | 80 | 100 | 5 | 10 |
| Zinc Chloride | 14 | 14 | 14 | 35 | 35 | 40 | 40 | 40 | 40 | 40 | 40 | 49 | 49 |
| Cures at 310° F. | | | | | | | | | | | | | |
| Tensile Strength, Max., p.s.i.: | | | | | | | | | | | | | |
| 15 minute cure | 2,080 | 2,860 | 3,500 | 5,680 | 7,550 | 4,840 | 7,650 | 12,820 | 11,340 | 8,490 | 6,820 | 5,790 | 8,540 |
| 30 minute cure | 1,860 | 2,730 | 3,250 | 5,510 | 8,860 | 5,740 | 9,760 | 11,860 | 10,660 | 8,390 | 5,250 | 8,720 | 7,890 |
| 60 minute cure | 1,850 | 2,430 | 3,380 | 6,460 | 10,010 | 6,860 | 10,300 | 11,480 | 10,270 | 7,700 | 5,990 | 10,110 | 11,140 |
| 120 minute cure | | | | 8,900 | 7,274 | | | 10,160 | 12,150 | | | | |
| Elongation, Percent: | | | | | | | | | | | | | |
| 15 minute cure | 120 | 87 | 56 | 89 | 36 | 98 | 24 | 9 | 6.4 | 5.0 | 4.0 | 85 | 42 |
| 30 minute cure | 130 | 76 | 34 | 50 | 12 | 73 | 4 | 6.4 | 5.7 | 4.3 | 2.9 | 50 | 2 |
| 60 minute cure | 110 | 62 | 29 | 44 | 3 | 44 | 2.5 | 6.6 | 5.1 | 3.9 | 3.2 | 3 | 2 |
| 120 minute cure | | | | 45 | 1 | | | 5.2 | 6.5 | | | | |
| Hardness, Shore A, Shore D (D) or Rockwell L (R): | | | | | | | | | | | | | |
| 15 minute cure | 85 | 91 | 62D | −3R | 65R | 78D | 53R | 100R | 98R | 75R | 74R | 82D | 64R |
| 30 minute cure | 87 | 93 | 68D | 58R | 87R | 79D | 85R | 107R | 106R | 98R | 84R | 63R | 93R |
| 60 minute cure | 90 | 94 | 75D | 75R | 100R | 51R | 96R | 111R | 110R | 100R | 93R | 93R | 103R |
| Swell in Benzene at Room Temperature, Percent by Volume: | | | | | | | | | | | | | |
| 15 minute cure: | | | | | | | | | | | | | |
| After 24 hrs | 92 | 59 | 41 | 15.5 | 7.3 | 13.3 | 5.1 | 3.4 | 2.2 | 2.3 | 2.4 | 6.6 | 3.1 |
| After 96 hrs | | | | 28.0 | 15.8 | 25.0 | 11.1 | 6.0 | 4.2 | 3.6 | 4.6 | 11.6 | 6.1 |
| After 168 hrs | | | | 43.3 | 24.6 | 39.6 | 17.5 | | | | | 16.6 | 9.6 |
| 30 minute cure: | | | | | | | | | | | | | |
| After 24 hrs | 90 | 75 | 56 | 12.6 | 6.3 | 11.0 | 3.6 | 0.8 | 0.8 | 0.6 | 0.8 | 5.9 | 1.7 |
| After 96 hrs | | | | 22.8 | 14.0 | 20.1 | 7.7 | 1.6 | 1.0 | 0.8 | 1.1 | 10.2 | 3.3 |
| After 168 hrs | | | | 35.0 | 22.5 | 30.3 | 12.7 | | | | | 14.3 | 5.6 |
| 60 minute cure: | | | | | | | | | | | | | |
| After 24 hrs | 88 | 81 | 60 | 13.4 | 4.0 | 9.8 | 3.6 | 0.9 | 0.5 | 0.3 | 0.4 | 3.7 | 2.0 |
| After 96 hrs | | | | 24.3 | 8.7 | 18.3 | 6.9 | 1.1 | 0.7 | 0.6 | 0.7 | 7.0 | 3.2 |
| After 168 hrs | | | | 38.7 | 14.8 | 27.6 | 11.8 | | | | | 10.4 | 4.9 |
| 120 minute cure: | | | | | | | | | | | | | |
| After 24 hrs | | | | 10.7 | 3.4 | | | 0.6 | 0.5 | | | | |
| After 96 hrs | | | | 17.8 | 6.7 | | | 0.6 | 0.7 | | | | |
| After 168 hrs | | | | 26.2 | 10.8 | | | 0.8 | 1.1 | | | | |
| Swell in Water at Room Temperature, Percent by Volume: | | | | | | | | | | | | | |
| 15 minute cure: | | | | | | | | | | | | | |
| After 24 hrs | | | | | | | | 5.4 | 4.5 | 4.5 | 4.2 | | |
| After 96 hrs | | | | | | | | 9.0 | 8.0 | 8.4 | 8.4 | | |
| After 168 hrs | | | | | | | | 14.2 | 13.1 | 12.6 | 13.4 | | |
| After 31 days | | | | | | | | 26.8 | 24.7 | 24.4 | 27.6 | | |
| 30 minute cure: | | | | | | | | | | | | | |
| After 24 hrs | | | | | | | | 3.7 | 3.6 | 2.3 | 2.8 | | |
| After 96 hrs | | | | | | | | 7.3 | 7.2 | 5.0 | 5.8 | | |
| After 168 hrs | | | | | | | | 10.0 | 10.0 | 8.2 | 8.5 | | |
| After 31 days | | | | | | | | 16.7 | 19.6 | 15.5 | 16.8 | | |
| 60 minute cure: | | | | | | | | | | | | | |
| After 24 hrs | 10.0 | 3.2 | 2.2 | 6.1 | 4.7 | 8.6 | 4.3 | 3.5 | 2.2 | 1.7 | 1.8 | 8.3 | 4.7 |
| After 96 hrs | 15.2 | 8.2 | 3.5 | 12.1 | 7.0 | 14.0 | 9.1 | 5.9 | 5.4 | 4.1 | 3.6 | 14.7 | 8.9 |
| After 168 hrs | 22.6 | 14.7 | 9.5 | 17.1 | 10.4 | 20.8 | 12.3 | 9.6 | 7.2 | 5.5 | 6.4 | 21.7 | 13.5 |
| After 30 days | | | | 33.1 | 21.2 | 39.7 | 23.0 | [2]16.5 | [2]14.9 | [2]12.5 | [2]13.6 | 39.5 | 27.7 |
| 120 minute cure: | | | | | | | | | | | | | |
| After 24 hrs | | | | 7.3 | 3.9 | | | 0.9 | 1.6 | | | | |
| After 96 hrs | | | | 12.0 | 6.2 | | | 2.9 | 3.4 | | | | |
| After 168 hrs | | | | 17.1 | 9.2 | | | 5.6 | 5.7 | | | | |
| After 30 days | | | | 45.2 | 25.0 | | | 10.1 | 12.9 | | | | |

[1] Butadiene-acrylonitrile copolymer (42–43% acrylonitrile content), manufactured by Goodyear Tire and Rubber Co.   [2] After 31 days.

Still higher levels of sulfur promoted further decline in the rate of water pick-up, but sulfur levels above about 40 parts per 100 parts rubber may have the disadvantage of high sulfur bloom.

Faster curing compositions were obtained by using both the sulfur and the metal halide as co-curatives than are customarily obtained with either curative alone. Referring to Table V, Example E-30, when compared with Example E-7 (Table I) and Preparation P-7 (Table I), evidences a very high tensile strength, e.g. above 12,000 p.s.i., obtained from the conjoint curing agent system for a 15 minute cure at a given temperature, indicating greater tensile strength at a lower cure time level.

It has been found that nitrile rubber compositions containing metal halide and sulfur can be transfer-molded with relatively short cure cycles. Transfer-molding studies have been conducted with compositions identified as Example E-30 (Table V) and Example E-7 (Table I). Satisfactory moldings, which were one-half ounce in weight and cylindrically shaped were produced from Example E-7 with a cure of 15 minutes at 340° F. and for Example E-30 with a cure of 2½ minutes at 360° F. Each of such products had Rockwell L values in the range of 100. During such short curing procedures, it is preferred to cool the mold by running cooling water through the platens of the press, although satisfactory materials have also been produced when the cooling is omitted. Added cooling is also a precaution against distorting the piece while it is being removed from the mold.

The transfer-mold products prepared from Example E-7 and Example E-30 were post-cured by placing in a circulating hot air oven operating at about 150° C. (302° F.) for periods of up to five hours. During the post-cure treating period, the products from Example E-30 showed no apparent distortion and only very slight swelling around the sprue holes of the mold, while those products from Example E-30 showed some distortion and much more swelling around the sprue holes.

It has also been found that the tendency to swell can be decreased by inclusion in the uncured mass, of a sufficient amount of finely-divided solid filler of very fine or powdery consistency or mesh. Such fillers include, for example, carbon black and finely-divided talc. Also, the tendency toward swelling in water can be lessened by inclusion of a plasticizing compound, i.e. plasticizer or compatible oil, in the uncured mass. Such plasticizing compounds include highly aromatic petroleum oil, silicone resin solution, epoxidized polyester plasticizer, etc. Such fillers and plasticizing compounds are well known to those in the art and other usable materials will be apparent. The usual dispersion improving agents, such as ethylene glycol, and other rubber additives, including vulcanization accelerators, such as benzothiazyl disulfide, can be used as desired. The beneficial effects of fillers and plasticizers are exemplified by the examples and test data reported in Table VI.

TABLE VI

| Recipe, in parts by weight | E-29 | E-36 | E-37 | E-38 | E-39 | E-40 | E-41 | E-42 | E-43 |
|---|---|---|---|---|---|---|---|---|---|
| Chemigum N300 | 100 | 100 | 100 | 100 | 100 | 100 | 100 | 100 | 100 |
| MPC Black | 40 | 70 | 100 | | | 40 | 40 | 40 | 40 |
| Mistron Vapor [1] | | | | 75 | 150 | | | | |
| Stearic Acid | 2 | 2 | 2 | 2 | 2 | 2 | 2 | 2 | 2 |
| Zinc Oxide | 3 | 3 | 3 | 3 | 3 | 3 | 3 | 3 | 3 |
| Sulfur | 10 | 10 | 10 | 10 | 10 | 10 | 10 | 10 | 10 |
| Benzothiazyl Disulfide | 1.5 | 1.5 | 1.5 | 1.5 | 1.5 | 1.5 | 1.5 | 1.5 | 1.5 |
| Diethylene Glycol | | | | 2 | 2 | | | | |
| Sundex 53 [2] | | | | | | 20 | | | |
| Dry-film 103 [3] | | | | | | | | | 10 |
| Paraplex G62 [4] | | | | | | | 15 | 30 | |
| Zinc Chloride | 40 | 40 | 40 | 40 | 40 | 40 | 40 | 40 | 40 |

| Cures at 310° F. | | | | | | | | | |
|---|---|---|---|---|---|---|---|---|---|
| Tensile Strength, p.s.i., Max.: | | | | | | | | | |
| 15 | 7,650 | 8,580 | 9,370 | 5,500 | 6,350 | 6,500 | 7,210 | 3,860 | 4,560 |
| 30 | 9,760 | 11,120 | 9,710 | 7,330 | 7,480 | 8,230 | 8,710 | 4,740 | 5,450 |
| 60 | 10,300 | 10,840 | 10,590 | 8,000 | 7,720 | 8,500 | 8,860 | 5,640 | 6,510 |
| Elongation, Percent: | | | | | | | | | |
| 15 | 24 | 22 | 2 | 10 | 1 | 20 | 33 | 47 | 47 |
| 30 | 4 | 2 | 1 | 2 | 1 | 13 | 8 | 30 | 40 |
| 60 | 2.5 | 2 | 2 | 1 | 1 | 2 | 3 | 13 | 18 |
| Hardness, Rockwell L: | | | | | | | | | |
| 15 | 53 | 97 | 100 | 68 | 73 | 68 | 76 | 4 | 32 |
| 30 | 85 | 105 | 107 | 81 | 86 | 75 | 90 | 44 | 59 |
| 60 | 96 | 107 | 110 | 94 | 94 | 85 | 92 | 63 | 79 |
| Swell in Benzene at Room Temperature, Percent by Volume: | | | | | | | | | |
| 15 minute cure: | | | | | | | | | |
| After 24 hrs | 5.1 | 6.7 | 5.0 | 15.3 | 13.8 | 19.4 | 17.4 | 27.2 | 13.1 |
| After 96 hrs | 11.1 | 11.6 | 8.3 | 24.9 | 22.9 | 34.7 | 29.4 | 61.0 | 24.1 |
| After 168 hrs | 17.5 | 14.5 | 10.3 | 29.9 | 27.6 | 51.6 | 40.4 | 61.6 | 34.1 |
| 30 minute cure: | | | | | | | | | |
| After 24 hrs | 3.6 | 4.2 | 2.4 | 10.1 | 9.2 | 11.8 | 10.1 | 19.0 | 9.8 |
| After 96 hrs | 7.7 | 8.8 | 6.3 | 19.6 | 18.3 | 25.6 | 20.9 | 42.2 | 20.3 |
| After 168 hrs | 12.7 | 10.8 | 7.6 | 24.5 | 22.5 | 32.5 | 25.8 | 60.3 | 25.8 |
| 60 minute cure: | | | | | | | | | |
| After 24 hrs | 3.6 | 3.5 | 2.2 | 9.3 | 8.2 | 11.2 | 9.8 | 17.7 | 8.6 |
| After 96 hrs | 6.9 | 7.1 | 4.8 | 17.1 | 15.4 | 23.2 | 19.3 | 37.0 | 16.9 |
| After 168 hrs | 11.8 | 9.4 | 6.1 | 21.4 | 19.1 | 28.9 | 23.6 | 54.7 | 21.9 |
| Swell in Water at Room Temperature, Percent by Volume: | | | | | | | | | |
| 15 minute cure: | | | | | | | | | |
| After 24 hrs | | 5.4 | 3.3 | 11.6 | 8.7 | 3.1 | 3.9 | 5.4 | 5.8 |
| After 96 hrs | | 11.1 | 6.8 | 18.0 | 13.3 | 7.0 | 8.5 | 11.3 | 12.0 |
| After 168 hrs | | 15.9 | 10.7 | 22.4 | 16.2 | 10.1 | 11.8 | 16.9 | 16.9 |
| After 32 days | | 34.9 | 22.4 | 32.9 | 30.4 | 23.3 | 26.9 | 42.6 | 37.6 |
| 30 minute cure: | | | | | | | | | |
| After 24 hrs | | 3.8 | 3.4 | 12.1 | 8.4 | 5.3 | 3.8 | 4.2 | 6.0 |
| After 96 hrs | | 8.2 | 7.0 | 19.2 | 11.8 | 8.6 | 7.9 | 9.9 | 12.3 |
| After 168 hrs | | 11.2 | 8.5 | 23.9 | 14.4 | 11.5 | 10.2 | 13.0 | 16.1 |
| After 32 days | | 25.6 | 18.4 | 41.7 | 27.3 | 23.7 | 22.7 | 32.9 | 37.1 |
| 60 minute cure: | | | | | | | | | |
| After 24 hrs | 4.3 | 3.7 | 2.1 | 9.4 | 7.0 | 3.9 | 3.5 | 4.1 | 6.2 |
| After 96 hrs | 9.1 | 8.4 | 6.7 | 16.3 | 11.0 | 8.7 | 8.1 | 9.4 | 12.4 |
| After 168 hrs | 12.3 | 10.2 | 7.5 | 18.9 | 12.6 | 9.8 | 9.6 | 11.3 | 15.3 |
| After 32 days | 23.0 | 24.6 | 16.2 | 30.5 | 20.3 | 22.3 | 21.3 | 27.1 | 36.5 |

[1] Finely divided talc, supplied by Sierra Talc Company.
[2] Highly aromatic petroleum oil, supplied by Sun Oil Company.
[3] 70% Silicone resin in Solvesso 100 Solvent, supplied by General Electric Co.
[4] Epoxidized polyester plasticizer, supplied by Rohm and Haas Company.

The data of Table VI demonstrate that water swelling during a 24-hour immersion can be reduced to a few percent by the inclusion of filler and plasticizer in the composition. The data indicate that high carbon black levels can be used to shorten cure time as well as reduce swell in both benzene and water. Modest amounts of compatible oils and plasticizers can be used to increase elongation and reduce swell, although the tensile strength and hardness are reduced. Thus, cured nitrile rubbers in accordance herewith can be produced to specification with respect to many of their various properties. For example, where a non-brittle and strong cured nitrile rubber is desired, e.g. with an elongation of 5% or greater, desirable for general use of the cured nitrile rubber, carbon black may be included at levels of 40 to 70 parts per 100 parts rubber while the compatible oil level is maintained at less than about 20 parts per 100 parts rubber. Such a composition is especially preferred in accordance herewith and the reduction in benzene and water swell is realized at its greatest in this range of carbon black and oil level when using the metal halide and sulfur in combination.

It is an advantage in the use of the combination of curing agents for nitrile rubber that the resulting products have high heat distortion temperatures after shorter cure times. This beneficial effect is demonstrated by the examples and data reported in Table VII below. When sulfur is present with the metal halide, the distortion temperature advances with the state of the cure.

TABLE VII.—DEFLECTION TEMPERATURE DATA [1]

| Identity | Curative, parts by wt. per 100 parts nitrile rubber | | Deflection Temperature, °C. | |
|---|---|---|---|---|
| | Zinc Chloride | Sulfur | 60 Min. Cure [2] | 120 Min. Cure |
| P-7 | | 20 | | 25 |
| P-8 | | 25 | | 45 |
| P-9 | | 35 | | 59 |
| E-30 | 40 | 20 | 83 | |
| E-31 | 40 | 40 | 81 | [3] 119, 177 |

[1] ASTM D648-56, 264 p.s.i. fiber stress.
[2] Cure at 310° F.
[3] Higher value obtained on rerun of first sample.

Additional runs were made comparing the action of both zinc chloride and sulfur an another recipe which includes a lower nitrile rubber. The results are reported in Table VIII.

TABLE VIII

| Recipe, in parts by weight | P-11 | E-44 | E-45 |
|---|---|---|---|
| Chemigum N625 [1] | 100 | 100 | 100 |
| GPF Black | 50 | 50 | 50 |
| Circo Oil | 6 | 6 | 6 |
| Zinc Oxide | 3 | 3 | 3 |
| Stearic Acid | 2 | 2 | 2 |
| Sulfur | 2 | 2 | |
| Benzothiazyl disulfide | 1.5 | 1.5 | 1.5 |
| Zinc Chloride | | 2 | 9.5 |
| Cures at 310° F. | | | |
| Tensile Strength, p.s.i.: | | | |
| 30 minute cure | 3,110 | 2,720 | 1,920 |
| 45 minute cure | 3,200 | 2,730 | 2,160 |
| 60 minute cure | 3,030 | 2,900 | 2,300 |
| Elongation, Percent: | | | |
| 30 minute cure | 470 | 210 | 800 |
| 45 minute cure | 500 | 220 | 670 |
| 60 minute cure | 420 | 230 | 650 |
| Hardness, Shore A: | | | |
| 30 minute cure | 65 | 74 | 61 |
| 45 minute cure | 70 | 73 | 65 |
| 60 minute cure | 70 | 75 | 70 |
| Swell in toluene, room temperature, after 24 hours immersion, percent by volume change, 60 minute cure | 159 | 119 | 148 |

[1] Copolymer of acrylonitrile and butadiene (32-33% acrylonitrile, manufactured by Goodyear Tire and Rubber Company).

All parts and percents given herein are parts and percents by weight unless otherwise indicated.

The foregoing detailed description is given for clearness of understanding only and no unnecessary limitations are to be understood therefrom, as some modifications will be obvious to those skilled in the art.

We claim:
1. A method of curing nitrile rubber which comprises mixing with said nitrile rubber from 2 to 500 parts by weight metal halide per 100 parts nitrile rubber and at least a vulcanizing amount of sulfur and subjecting the resulting mixture to curing conditions for a sufficient time to cure the nitrile rubber to the desired cured state and to create coordination bonds between molecules of the nitrile rubber and the metal halide, thereby cross linking the rubber in addition to vulcanizing the rubber.

2. The method of claim 1 wherein the amount of metal halide is at least 10 parts per 100 parts rubber and the amount of sulfur is at least 2 parts per 100 parts rubber.

3. The method of claim 1 wherein the amount of metal halide is at least 50 parts per 100 parts of nitrile rubber.

4. The method of claim 1 wherein the amount of metal halide and sulfur fall in the respective ranges of 10 to 100 and 10 to 30 parts per 100 parts rubber.

5. The method of claim 1 wherein the metal of said metal halide is selected from the class consisting of zinc, cadmium, nickel and cobalt.

6. As a composition of matter, vulcanized and cross linked nitrile rubber including the residuum of from 2 to 500 parts metal halide per 100 parts of rubber and the residuum of at least a vulcanizing amount of sulfur, said residuum of metal halide having coordination bonds with nitrile rubber and cross linking the nitrile rubber.

References Cited

UNITED STATES PATENTS 2,434,129   1/1948   Throhdahl _____ 260—82.3
2,879,262   3/1959   Sullivan _____ 260—79.5

MORRIS LIEBMAN, *Primary Examiner.*

S. F. FOX, *Assistant Examiner.*